United States Patent [19]

Lapeyre et al.

[11] Patent Number: 4,668,026
[45] Date of Patent: May 26, 1987

[54] COMPUTER TERMINAL SUPPORT CABINET WHICH ELIMINATES REFLECTION AND GLARE FROM VISUAL DISPLAYS

[75] Inventors: James M. Lapeyre; James O. Gundlach, both of New Orleans, La.

[73] Assignee: The Lai-ram Corporation, Harahan, La.

[21] Appl. No.: 886,933

[22] Filed: Jul. 18, 1986

Related U.S. Application Data

[63] Continuation of Ser. No. 697,262, Feb. 1, 1985.

[51] Int. Cl.⁴ ............................................... A47B 5/00
[52] U.S. Cl. ...................................... 312/7.2; 108/60; 312/239; 350/276 R
[58] Field of Search ................. 312/7.2, 239; 362/457; 108/60; 400/713, 714; 350/276 R, 276 SL

[56] References Cited

U.S. PATENT DOCUMENTS

| | | | |
|---|---|---|---|
| 2,759,178 | 8/1956 | Rose | 312/7.2 |
| 2,805,411 | 9/1957 | Rose | 312/7.2 X |
| 3,036,154 | 5/1962 | Harman | 312/7.2 X |
| 3,062,917 | 11/1962 | Rose | 312/7.2 X |
| 3,961,159 | 6/1976 | Hursey | 350/276 R |
| 4,032,222 | 6/1977 | Lapeyre | 350/276 R |
| 4,444,465 | 4/1984 | Giulie et al. | 350/276 R |
| 4,529,268 | 7/1985 | Brown | 350/276 R |

OTHER PUBLICATIONS

CRR ® Design Bulletin, Digicourse, Inc., Copyright 1980.
IBM ® Technical Disclosure Bulletin; vol. 27, No. 6; Nov. 1984.

Primary Examiner—James T. McCall
Attorney, Agent, or Firm—James C. Kesterson

[57] ABSTRACT

A cabinet for use with a visual display for eliminating reflections and glare with respect to an observer having a selected eyepoint is disclosed. The cabinet includes a housing 9 having means mounted to housing 9 for adjustably positioning a visual display having a viewing plane 30. The viewing plane 30 is oriented with respect to a nominal eyepoint 28 of an observer such that the viewing plane 30 is at a selected angle between 65° and 30° with respect to a line of sight extending from the selected nominal eyepoint 28. A support shelf 22 secured to housing 9 supports and locates a keyboard 24 at a viewing position juxtaposed to the visual display CRT 18 such that minimal eye motion is required for an observer to view both visual display 18 and keyboard 24. Also included is an adjustable light obstructing shield 16 having a front edge 26 and a light absorbing inside surface 44. The front edge 26 of light obstructing shield 16, and the display angle of the viewing display 30 are selected such that a light path extending from the eyepoint 28 to any point on the viewing plane 30 is reflected into the light absorbing surface 44 of light obstructing shield 16. This thereby substantially eliminates all glare and reflections originating from an ambient light source.

9 Claims, 8 Drawing Figures

COMPUTER TERMINAL SUPPORT CABINET WHICH ELIMINATES REFLECTION AND GLARE FROM VISUAL DISPLAYS

This application is a continuation of application Ser. No. 697,262, filed Feb. 1, 1985.

TECHNICAL FIELD

This invention relates generally to a support cabinet which eliminates reflections and glare from visual displays, and more particularly to a support cabinet for use with computer terminals having a visual display and an associated keyboard. Unlike similar prior art devices which eliminate glare and reflections, the support cabinet of this invention includes means for adjusting the angle of the visual display relative to the front edge of a light obstructing shield.

BACKGROUND ART

With the greatly increased use of personal computer terminals having visual displays in both the workplace and home, the problem of reflection and glare has become acute. Such reflection and glare, now represents one of the major objections and problems associated with long and continuous use of CRT type and other visual display. Although the problem has existed for years with television and other CRT displays, extreme long term concentrated viewing was not required, since the casual television viewer could always look aside or shift his head to a different position to avoid reflections or glare on the television screen. Unfortunately, with respect to computer terminals and the like, the operator must maintain his eyepoint within a limited range of positions since he or she may also be required to refer to an input data source or a keyboard which is located proximate the visual display. Consequently, freedom of head motion so as to find a location where reflections and glare from the CRT screen are not objectionable may not be possible. The basic concept of such glare and reflection reduction used by the present invention was first disclosed in U.S. Pat. No. 4,032,222 issued to J. M. Lapeyre. As disclosed in that patent, the natural and still common practice of orienting the display plane of a visual display at right angles with the line of sight from an observer's eyepoint may represent the worst possible orientation for such a light emitting display. As is further disclosed in that patent, glare can be eliminated by proper orientation of the display plane of the visual display in combination with the use of a light obstructing shield. As disclosed in the aforementioned Lapeyre patent, the inventive concept may be used with many and varied light emitting displays. In addition, U.S. Pat. No. 4,235,523 also to Lapeyre discloses and claims a very important use of the original concept as it applies to traffic signals. It will of course be appreciated that traffic signals being located outdoors are subjected to extreme glare and are particularly subjected to glare from the sun. Other patents considered relevant to the basic concept during the prosecution of the U.S. Pat. No. 4,032,222 patent include U.S Pat. Nos. 2,162,791 to Shreve; 2,819,459 to Dodd; 3,499,112 to Heilmeir, et al; 3,531,178 to Wirth; 3,566,602 to Bergey, et al; and 3,881,805 to Hosokawa, et al. In addition, various electronic arcade games and pocket-size portable television receivers which of course use cathode ray tubes as a display source incorporate the basic concept of the original Lapeyre U.S. Pat. No. 4,032,222 patent. However, to this date, the applicants are not aware of any support cabinet for a computer terminal display which provides for continuing elimination of reflection and glare while also allowing for selective positioning of the viewing plane and the light obstructing shield to a desired position depending on the particular eyepoint and needs of the observer.

Therefore, it is an object of the present invention to provide a support cabinet for visual display systems whereby reflection and glare is eliminated with respect to an adjustable nominal eyepoint.

It is another object of the present invention to provide a support cabinet for a computer terminal display system which operates in conjunction with an input keyboard to eliminate glare and reflection and minimize necessary eye movement between the keyboard and the display.

DISCLOSURE OF THE INVENTION

Other objects and advantages will in part be obvious and will in part appear hereinafter, and will be accomplished by the present invention which discloses a unique cabinet for use with a visual display. The visual display defines a viewing plan which is located close to and elevated above an associated keyboard. The support cabinet eliminates reflection and glare from the visual display with respect to an observer having an eyepoint located within a range of positions which allows the observer to simultaneously manipulate the keyboard, and view the display and the keyboard. The support cabinet comprises a housing for containing the visual display and to which there is mounted means for supporting and adjustably positioning the visual display. The visual display is positioned at a selected orientation with respect to a nominal eyepoint of an observer which is selected from a range of eyepoint positions such that the viewing plane of the visual display is at an angle of between about 65° and 30° with respect to a line of sight extending from the selected nominal eyepoint. A support shelf is secured to the housing and supports and locates the keyboard in full view and juxtaposed to the visual display such that minimal eye motion is required to view both the display and the keyboard. According to one embodiment, there is also included an adjustable light obstructing shield having a light absorbing under surface. The position of the front edge of the light obstructing shield may be adjustable and extends toward the nominal eyepoint. The front edge is located, and the display angle is selected such that a light path extending from the eyepoint to any point on the viewing plane is reflected into the light absorbing surface of the light obstructing shield. This arrangement subsequently eliminates all glare and reflections originating from ambient light. In one preferred embodiment, the member supporting the visual display is pivotally mounted to provide the adjustable positioning, and similarly the light obstructing shield may also be adjusted such as by sliding or pivoting to allow the front edge of the light obstructing shield to be adjustably located.

BRIEF DESCRIPTIONS OF THE DRAWINGS

The above mentioned features of the present invention will be more clearly understood from the consideration of the following description in connection with the accompanying drawing wherein.

Figure 1:
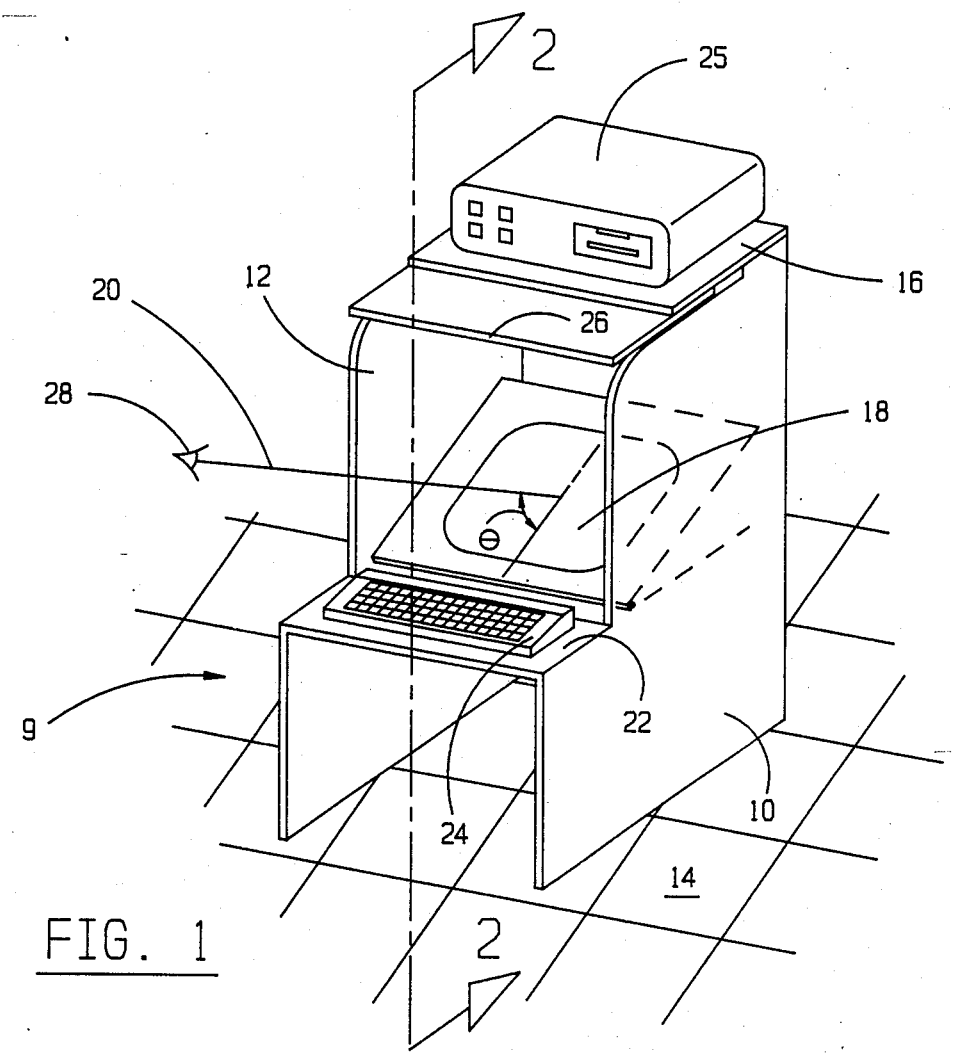
FIG. 1 is a perspective view of a floor model of a computer terminal support cabinet incorporating the features of the present invention.
Figure 8:
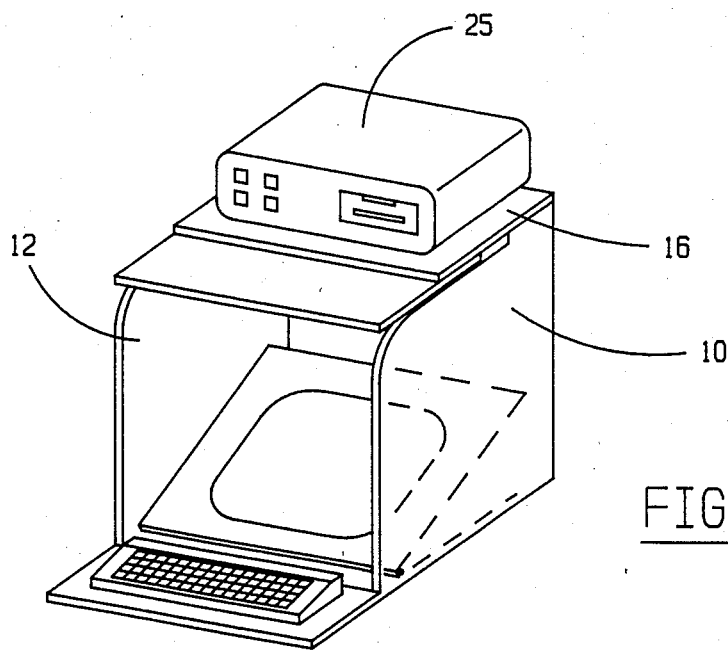

FIG. 8 disclosed a cabinet similar to that shown in FIG. 1 which is suitable for resting on a table or support means.

BEST MODE FOR CARRYING OUT THE INVENTION

Referring now to FIG. 1, there is shown generally at 9 a floor model of a computer terminal support cabinet employing the features of this invention. As disclosed in this embodiment, the cabinet 9 includes a first side 10 and a second side 12 both of which extend from the floor 14 to a top member 16. Below top member 16 it can be seen that the screen or face of a CRT tube 18 is supported such that it makes a selected angle theta ($\theta$) with respect to a line of sight 20 emanating from a nominal eyepoint. As will be discussed hereinafter, the angle theta ($\theta$) may be adjustable according to the teachings of this invention with respect to any selected and nominal eyepoint. Cabinet sides 10 and 12 further support a shelf 22 upon which, in typical use of the cabinet, there will be located a keyboard terminal 24 which allows data input to the computer terminal. Also, in the embodiment shown, sides 10 and 12 provide a recess for the knees of a seated operator (not shown). In addition, as shown in the figure, the top member 16 of this embodiment includes front edge 26 which may be adjusted by sliding back and forth. The top member 16 may also be used to support other components of a computer system such as a disc drive 25 or a printer for providing a typed copy of data.

Figure 2:
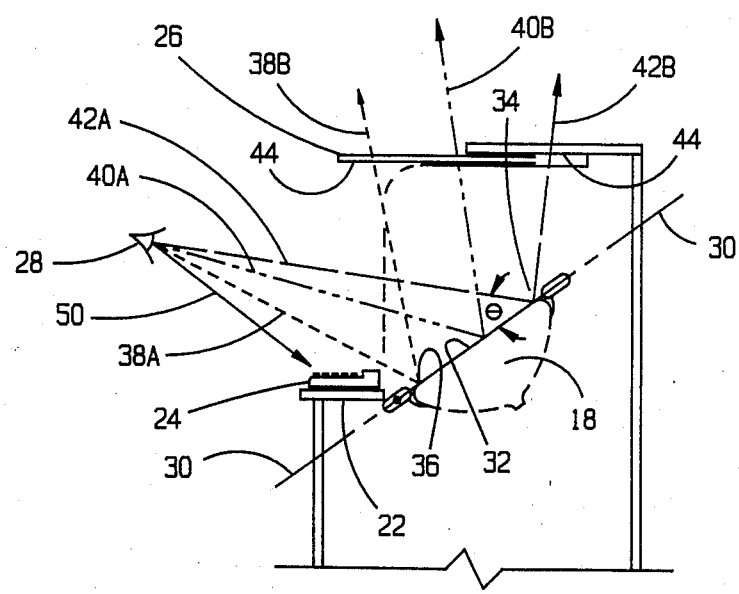
FIG. 2 is a cross-section of the cabinet of FIG. 1 taken along lines 2—2.

Referring to FIG. 2, there is illustrated a cross-sectional view of FIG. 1 of the computer terminal cabinet. Those components shown in FIG. 2 which are the same as shown in FIG. 1 will carry the same reference numbers. In a similar manner, all other figures discussed hereinafter, will also carry similar reference number for like components. Also illustrated in FIG. 2 is a nominal eyepoint 28 of an observer viewing the CRT 18 which of course, is located in the cabinet. In the cross-sectional view of FIG. 2, the line 30, represents a viewing plane defined by the screen 32 of CRT 18. It will be appreciated by those skilled in the art that the actual surface of a typical CRT screen is not perfectly planar. Therefore, a nominal plane, or viewing plane will be used to represent an average of all the possible viewing surfaces.

Also, as can be seen more clearly in this FIG. 2, the CRT has an upper edge 34 and a lower edge 36. It will, of course, be appreciated that all meaningful computer information will be disclosed within these upper and lower edges. As will be appreciated by those skilled in the art, the laws of basic physics require that with respect to a reflecting or mirror surface, the angle of incidence of a light path is equal to the angle of reflectance. Thus as shown in FIG. 2, dotted line 38A wll strike the viewing display surface of the CRT 18 at a particular angle. The light path will then be reflected from the surface of the CRT at a similar angle. This means that the light path 38A will leave the eyepoint 28, be reflected off of viewing plane 30 of the CRT 18 and then reflected away from the viewing plane 30 at an angle equal to the angle of incidence as indicated by dotted line 38B. In a similar manner, the alternating dashed and dotted line 40A from the eyepoint 28 will be reflected from the mid point of the viewing plane 30 at an angle similar to its angle of incidence as is indicated by the line 40B. Likewise at the top 34 of the CRT display, a light path 42A extending from eyepoint 28 will also be reflected at a reflection angle equal to the angle of incidence as is indicated by the dashed line 42B. At this point, it is important to note that the front edge 26 of top member 16 of the cabinet extends forward toward the eyepoint such that the light path 38B is intersected. Also, of course, as is clearly seen the other light paths 40B and 42B are also intersected by top member 16 and would of course be intersected even if the front edge 26 did not extend as great a distance toward the eyepoint 28. Thus, it will be appreciated by those skilled in the art that if the under surface 44 of top member 16 is not reflective, but instead has light absorbing characteristics, it will be impossible for light to be reflected from any ambient source back to the eyepoint 28 of an observer.

It will also be appreciated by one skilled in the art that depending upon the eyepoint 28 of the observer, both the front edge 26 of the light obstructing member and the angle theta $\theta$ of the viewing plane with respect to the observers line of sight may be adjusted within limits without detrimentally affecting the glare and reflection eliminating capabilities of the cabinet. However, from FIGS. 1, 2 and 8, it should also be readily appreciated that in certain embodiments, front edge 26 may be fixed so long as it is positioned forward sufficiently to intersect a light path which is reflected from the bottom edge 36 of visual display 18 and which originated from the nominal eyepoint 28.

Figure 3:
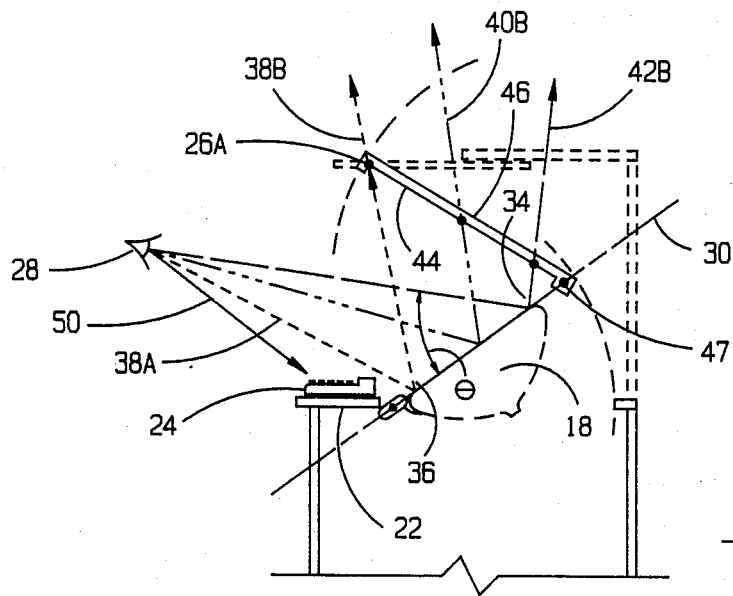
FIG. 3 is a side view of a cabinet incorporating the features of the invention, and includes an alternate embodiment of a light obstructing shield from that shown in FIG. 2.

Referring now to FIG. 3, there is shown an alternate embodiment of a cabinet similar to that discussed above except that the light obstructing shield is pivoted to the cabinet at a point adjacent or close to the top edge 34 of the CRT. The embodiment of FIG. 3 allows for a very compact cabinet and also the simplicity aids in understanding the present invention. To avoid confusion, the front edge 26A of the light obstructing member 46 is shown as intersecting the light path 38B at approximately the same point as the sliding shield shown in FIG. 2. For purposes of discussion, it will also be appreciated that except for the light obstructing shield 46 all other elements of Fig. 2 correspond to like elements of FIG. 3. Further, as can be seen by comparing FIGS. 2 and 3, the location of the eyepoint, the angle of the viewing plane 30, the location of the keyboard 24, etc. all correspond.

As shown in the embodiment disclosed in FIG. 3, light obstructing shield 46 is pivotally attached at pivot point 47 to the cabinet such that the axis of rotation is located adjacent or close to the upper edge 34 of CRT 18. Further in the embodiment shown the shield 46 may be rotated down and close off the CRT when not in use for protection purposes. It is also important to note at this time that the keyboard 24 is also very closely located to the CRT 18 such that minimal eye movement from eyepoint 28 from the CRT screen 18 to the keyboard 24 is minimized as indicated by line of sight arrow 50.

Figure 4:
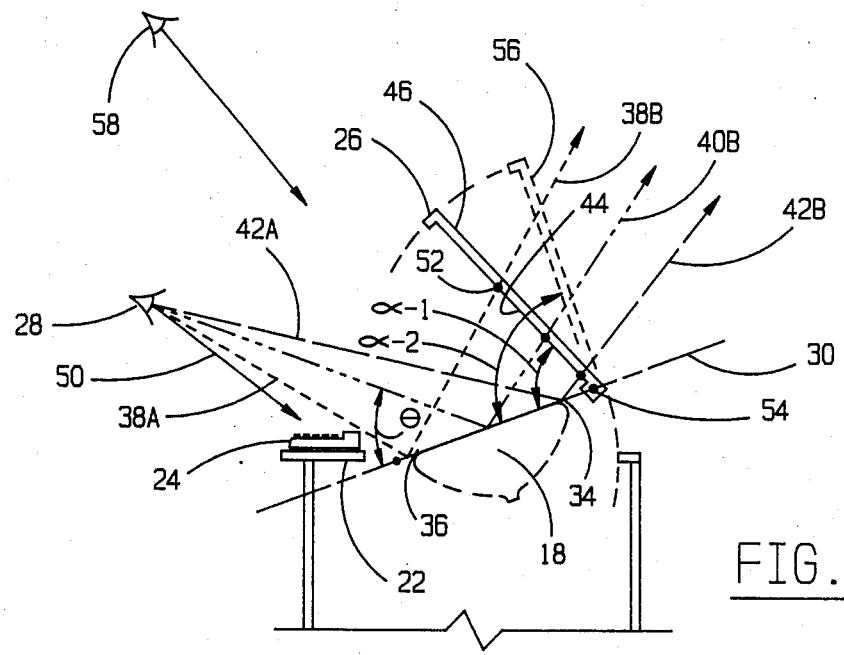
FIG. 4 shows in greater detail the adjustable features of the present invention wherein the viewing plane relative to the front edge of the light obstructing shield may be varied.

Referring now to FIG. 4, there is shown the cabinet embodiment of FIG. 3 wherein the angle theta ($\theta$) representing the orientation of the viewing plane 30 of the CRT 18 with respect to the line of sight of an observer has been changed to a lesser angle. However, as is also clear the remaining location and structures of the cabinet remain the same and in fact the light obstructing shield 46 is shown in approximately the same angular location with respect to viewing plane 30. When the CRT viewing plane 30 is positioned in such a position, it can be seen that the light path 42A extending from eyepoint 28 to the top portion 34 of the CRT 18 will still be reflected into the bottom surface 44 of light obstructing shield 46. Similarly, the light path 38A from eyepoint 28 which extends to the lower portion 36 of the CRT 18 will also be reflected into the bottom surface 44 of light obstruction shield 46. However, it will be noted that instead of the light shield 46 intersecting the reflected light path 38B close to its edge 26, light path 38B intersects the light obstructing shield 46 at a point 52 which is more centrally located. Thus, it will be appreciated that for purposes of viewing the CRT 18 from eyepoint 28 with the CRT at the angle shown and the light obstructing shield 46 positioned as shown, the light obstructing shield 46 could be substantially shorter such that the front edge 26 need not extend pass the point 52 on shield 46 as indicated. Consequently, it will also be appreciated that a light shield 46 of substantially the same size shown may be rotated around its pivot point 54 from a first angle alpha ($\alpha$)1 to a very wide angle alpha ($\alpha$)2 as indicated in phantom lines 56 and still intersect the light path 38B. Even at this large angle location of light obstructing shield 46, the reflection and glare eliminating capabilities of the cabinet will still be present. In the embodiment shown in FIGS. 3, 4 and 5, it can be seen that the angle alpha ($\alpha$) between the pivoting light obstructing shield 46 and the viewing plane 30 is an acute angle. Therefore, it should be understood that with respect to embodiments such as shown in FIGS. 1, 2 and 8 as well as FIGS. 3, 4 and 5, the important consideration is that a line extending from the front edge 34 of the CRT screen 18 to the front edge 26 of the light obstructing shield always be at an acute angle with respect to the viewing plane 30.

As shown in FIG. 4, a second observer having an eyepoint at a higher location than that of the primary observer 28 such as indicated by eyepoint 58, would be able to see substantially all of the viewing plane and screen of CRT 18 even though an observer having an eyepoint at location 58 would not receive all of the glare and reflection eliminating features and advantages of the cabinet. Of course, even though an observer having an eyepoint at location 58 would not continue to benefit from the glare and reflection eliminating capabilities, the primary observer having an eyepoint at 28 would still achieve such benefits. Of course, if the light obstructing shield 46 is rotated to the alpha ($\alpha$)1 position as indicated in FIG. 3, an observer at 58 may benefit from the glare and reflection eliminating capabilities but will not be able to view the entire screen.

Thus, it can clearly be seen that by allowing the orientation of the viewing plane 30 of CRT 18 with respect to eyepoint 28 and allowing the front edge 26 of the light obstructing shield to be adjustably located, operators of various sizes and heights and having eyepoints at various locations may adjust the cabinetry for the most comfortable viewing position to them while at the same time continuing to enjoy the glare and reflection eliminating capabilities of the invention.

Figure 5:
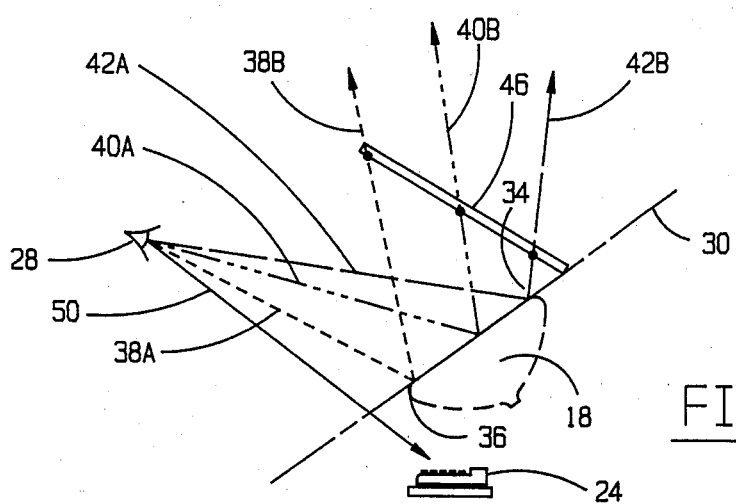
FIG. 5 shows an alternate embodiment of the present invention wherein the front edge of the computer terminal keyboard may be under or behind the front edge of the visual display.
Figure 6:
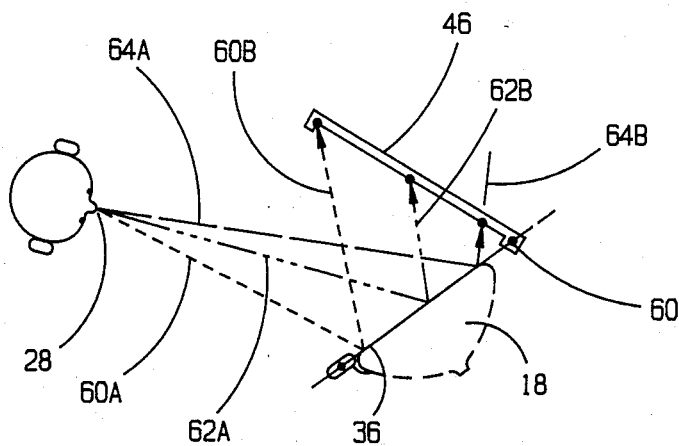
FIG. 6 is a top view of an alternate embodiment of a cabinet employing the features of this invention wherin the light obstructing shield is located to the side of the visual display.
Figure 7:
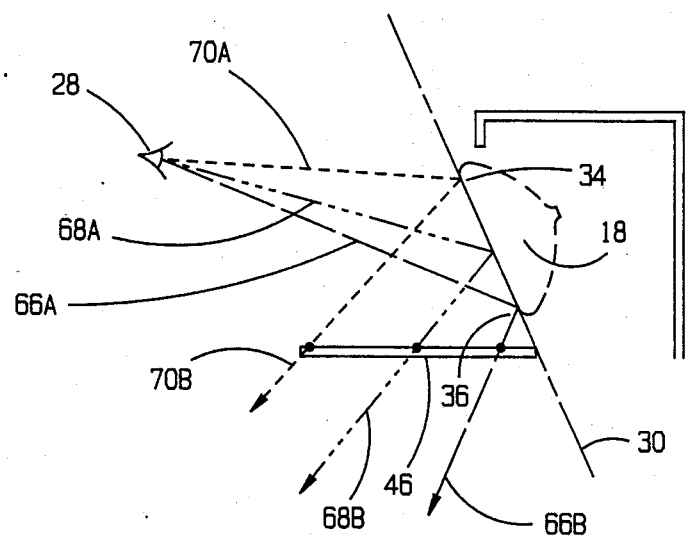
FIG. 7 is still another alternate embodiment of a cabinet employing the features of this invention wherein the top of the visual display is closer to the nominal eyepoint of the observer and the light obstructing shield is below the visual display.

FIGS. 5, 6, and 7 each show alternate embodiments of cabinet arrangements which incorporate the features of the present invention. For example, it can be seen from FIG. 5 that the keyboard 24 need not be in front of the front of the bottom or lower edge of CRT 18 but may in fact be at a further distance from the eyepoint than front edge 36. Such an arrangement would still allow minimum movement of the eye to observe both the CRT 18 and the keyboard and still accomplish the purposes of the invention. Such an arrangement as that shown in FIG. 5 might be particularly useful for various types of radar operations which require an observer to view a CRT screen continuously while at the same time control a input keyboard.

Whereas the discussions of the embodiments of the FIGS. 1 through 5 show a CRT viewing plane oriented so that the bottom edge of the viewing screen is always closer to the eyepoint 28. FIG. 6 illustrates that the teachings of this invention may equally be applicable to a CRT having a vertical orientation and wherein the light obstructing shield 46 pivots or rotates around a verical axis 60. As will be appreciated by one skilled in the art, all that is necessary is that the light path from the eyepoint of an observer represented by lines 60A, 62A and 64A be intersected by the light obstructing shield 46 as indicated by the extension of light paths 60B, 62B and 64B.

In a similar manner, it will be appreciated that the viewing plane 30 may be oriented such that the top edge 34 of the CRT is closer to the eyepoint 28. In such a case, the light obstructing shield 46 will be located below the CRT 18 as is clearly shown in FIG. 7. Thus, it is clear that various orientation of the CRT and the light obstructing shield are possible and still fall within the scope of the present invention.

FIG. 8 shows a cabinet substantially the same as that shown in FIG. 1, except that the cabinet sides 10 and 12 do not extend to the floor 14, but instead are made much shorter such that the entire cabinet may rest on a table or other supporting means.

Thus, although the present invention has been described with respect to specific designs and embodiments for providing a glare and reflection eliminating computer terminal cabinet, it is not intended that such specific references be considered as limitations upon the scope of this invention except insofar as set forth in the following claims.

What is claimed is:

1. A cabinet for use with a keyboard and a visual display defining a viewing plane to eliminate reflections and glare from said visual display with respect to an observer having an eyepoint at a position selected such that said observer can simultaneously manipulate said keyboard, and view said display and said keyboard, said cabinet comprising:

a housing;

means mounted to said housing for supporting and adjustably positioning said visual display at a selected orientation with respect to said eyepoint of said observer, such that the viewing plane of said visual display is at a selected display angle of between 65° to 30° with respect to a line of sight extending from said eyepoint; and a light obstructing shield having a front edge and a light absorbing surface, said light obstructing shield being mounted to said housing and positioned such that a line extending from said front edge to a top edge of said visual display forms an acute angle with said viewing plane of said visual display, and said front edge extends toward said eyepoint, said front edge extending sufficiently forward and said display angle and said acute angle being selected such that a light path extending from said eyepoint to any point on said visual display is reflected onto said light absorbing surface of said light obstructing shield said display angle, light obstructing shield and said acute angle all thereby cooperating so as to substantially eliminating all glare and reflections originating from ambient light.

2. The cabinet of claim 1 wherein said means is pivotally mounted to provide said adjustable positoning of said visual display.

3. The cabinet of claim 1 and further including a support shelf secured to said housing for supporting and locating said keyboard at a position juxtaposed to said visual display such that minimal eye motion is required for an observer to view substantially all of said visual display and said keyboard.

4. The cabinet of claim 2 and further including a support shelf secured to said housing for supporting and locating said keyboard at a position juxtaposed to said visual display such that minimal eye motion is required for an observer to view substantially all of said visual display and said keyboard.

5. The cabinet of claims 3 or 4 wherein said front edge of said light obstructing shield is adjustable.

6. The cabinet of claim 5 wherein said light obstructing shield is pivotally mounted to allow said front edge to be adjustaby located.

7. The cabinet of claim 5 wherein said front edge of light adjusting shield is slidable toward and away from said nominal eyepoint to allow said front edge to be adjustably located.

8. The cabinet of claim 5 wherein said housing includes a base member extending to the floor.

9. The cabinet of claims 1, 2, 3 or 4 in said housing includes a base member extending to the floor.

* * * * *